(12) United States Patent
Ricketts

(10) Patent No.: US 10,588,351 B2
(45) Date of Patent: Mar. 17, 2020

(54) CARTRIDGE AND DEVICE FOR AN AEROSOL-GENERATING SYSTEM

(71) Applicant: Philip Morris Products S.A., Neuchatel (CH)

(72) Inventor: Nikolaus Martin Ernest Wilhelm Ricketts, Geneva (CH)

(73) Assignee: Philip Morris Products S.A., Neuchatel (CH)

( * ) Notice: Subject to any disclaimer, the term of this patent is extended or adjusted under 35 U.S.C. 154(b) by 69 days.

(21) Appl. No.: 15/578,839

(22) PCT Filed: Jun. 27, 2016

(86) PCT No.: PCT/EP2016/064886
§ 371 (c)(1),
(2) Date: Dec. 1, 2017

(87) PCT Pub. No.: WO2017/001351
PCT Pub. Date: Jan. 5, 2017

(65) Prior Publication Data
US 2018/0295882 A1 Oct. 18, 2018

(30) Foreign Application Priority Data
Jun. 29, 2015 (EP) .................................... 15174395

(51) Int. Cl.
*A24F 47/00* (2006.01)
*A24B 15/16* (2006.01)
(Continued)

(52) U.S. Cl.
CPC ............ *A24F 47/008* (2013.01); *A24B 13/02* (2013.01); *A24B 15/167* (2016.11); *A24D 1/002* (2013.01); *A24D 1/14* (2013.01); *B01D 29/01* (2013.01)

(58) Field of Classification Search
CPC ...... A24F 47/002; A24F 47/008; A24B 13/02; A24B 15/167; A24D 1/002; A24D 1/14;
(Continued)

(56) References Cited

U.S. PATENT DOCUMENTS 5,515,842 A * 5/1996 Ramseyer ......... A61M 15/0085
128/200.14
9,681,688 B1 * 6/2017 Rinehart ............... A61M 15/06
(Continued)

FOREIGN PATENT DOCUMENTS

CN 103929985 A 7/2014
CN 103987286 A 8/2014
(Continued)

OTHER PUBLICATIONS

International Search Report and Written Opinion dated Jan. 17, 2017 in PCT/EP2016/064886, filed Jun. 27, 2016.
(Continued)

*Primary Examiner* — Ryan A Reis
(74) *Attorney, Agent, or Firm* — Oblon, McClelland, Maier & Neustadt, L.L.P.

(57) ABSTRACT

There is provided a cartridge for an aerosol-generating system, the cartridge including: a liquid storage container containing a liquid aerosol-forming substrate including at least one flavor object; an outlet; a filter disposed between the outlet and a portion of the liquid storage container including the at least one flavor object; and a liquid transport element, having a first part and a second part, movable from a first position to a second position, wherein in the first position the first part of the liquid transport element is external to the cartridge and adjacent the outlet, and in the second position the first part of the liquid transport element is internal to the cartridge and remote from the outlet.

9 Claims, 8 Drawing Sheets

(51) Int. Cl.

| | | |
|---|---|---|
| *A24D 1/14* | (2006.01) | |
| *A24B 15/167* | (2020.01) | |
| *A24B 13/02* | (2006.01) | |
| *A24D 1/00* | (2020.01) | |
| *B01D 29/01* | (2006.01) | |

(58) Field of Classification Search
CPC ....... A61L 9/037; A61L 9/127; A61M 11/042; A61M 15/0041; A61M 15/06
See application file for complete search history.

(56) References Cited

U.S. PATENT DOCUMENTS

| | | | |
|---|---|---|---|
| 2011/0036363 A1* | 2/2011 | Urtsev | A24F 47/002 131/273 |
| 2012/0199663 A1* | 8/2012 | Qiu | A61M 11/041 239/8 |
| 2014/0069424 A1 | 3/2014 | Poston et al. | |
| 2014/0216450 A1 | 8/2014 | Liu | |
| 2014/0216483 A1 | 8/2014 | Alima | |
| 2014/0261483 A1* | 9/2014 | Hopps | A24B 15/24 131/298 |
| 2014/0373856 A1 | 12/2014 | Zuber et al. | |
| 2015/0027454 A1 | 1/2015 | Li et al. | |
| 2015/0027468 A1 | 1/2015 | Li et al. | |
| 2015/0059780 A1* | 3/2015 | Davis | A24F 47/008 131/328 |
| 2015/0201674 A1* | 7/2015 | Dooly | B65B 5/06 53/432 |
| 2015/0335071 A1* | 11/2015 | Brinkley | F22B 1/284 131/328 |
| 2016/0331033 A1 | 11/2016 | Hopps et al. | |

FOREIGN PATENT DOCUMENTS

| | | |
|---|---|---|
| CN | 204146338 U | 2/2015 |
| EP | 0 295 122 B1 | 1/1992 |
| EP | 1 618 803 B1 | 12/2008 |
| EP | 1 736 065 B1 | 6/2009 |
| EP | 2 473 069 A2 | 7/2012 |
| EP | 2 543 265 A2 | 1/2013 |
| EP | 2 543 265 A3 | 1/2013 |
| EP | 3 042 577 A1 | 7/2016 |
| WO | WO 2008/108889 A1 | 9/2008 |
| WO | WO 2012/070107 A1 | 5/2012 |
| WO | WO 2013/060827 A1 | 5/2013 |
| WO | WO 2013/098409 A1 | 7/2013 |
| WO | WO 2015/046385 A1 | 4/2015 |
| WO | WO 2015/086318 A1 | 6/2015 |

OTHER PUBLICATIONS

Written Opinion of the International Searching Authority dated Jul. 28, 2017 in PCT/EP2016/064886 filed Jun. 27, 2016, citing documents AM and AN therein, 5 pages.

Partial European Search Report dated Dec. 23, 2015 in Patent Application No. 15174395.2, citing document AL therein, 12 pages.

"Forum-Ecigarette • Le Repaire Des Vapoteurs • Cigarette Electronique" http://www.forum-ecigarette.com/tabacs-blonds-f1495/le-liquide-qui-a-un-gout-de-tueuses-t56419, 2012, 29 Pages.

"Blackstar—Trabuco Vapors 30 ml" http://www.ecig-shop.fr/trabuco-vapors/628-trabuco-silverado-30ml.html, 2016, 2 pages.

Chinese Office Action with English translation dated Dec. 17, 2019 in corresponding Chinese Patent Application No. 201680034989.5, citing documents AO-AQ therein (13 pages).

* cited by examiner

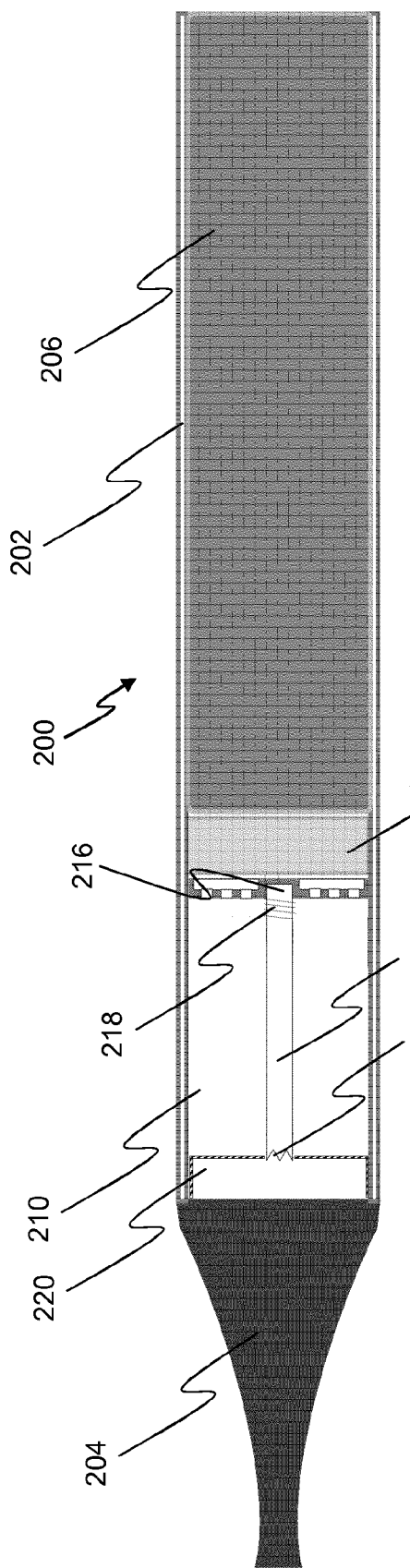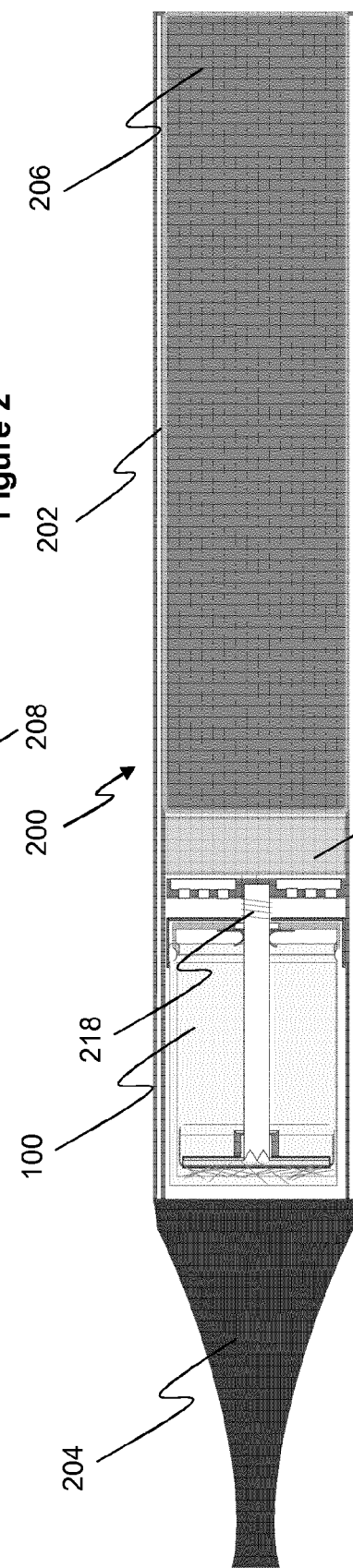

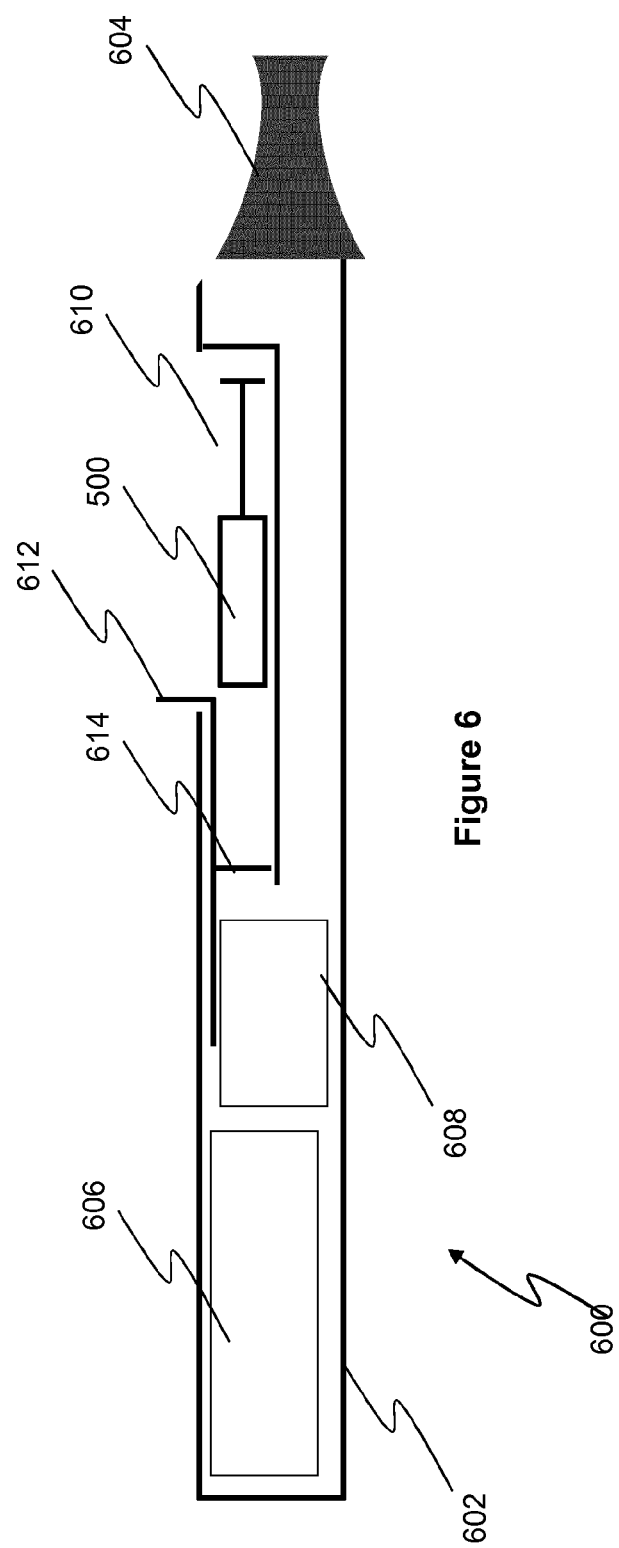

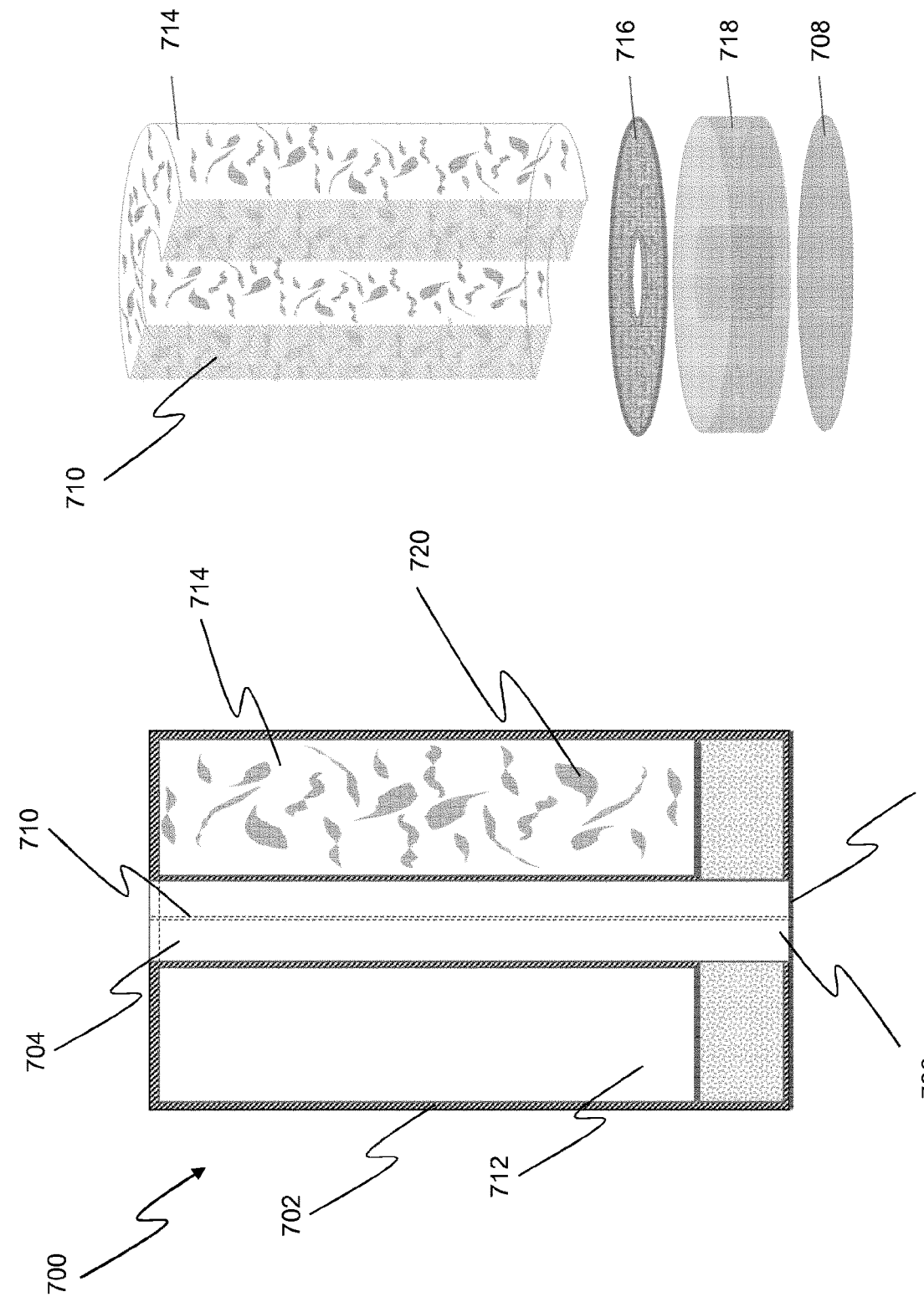

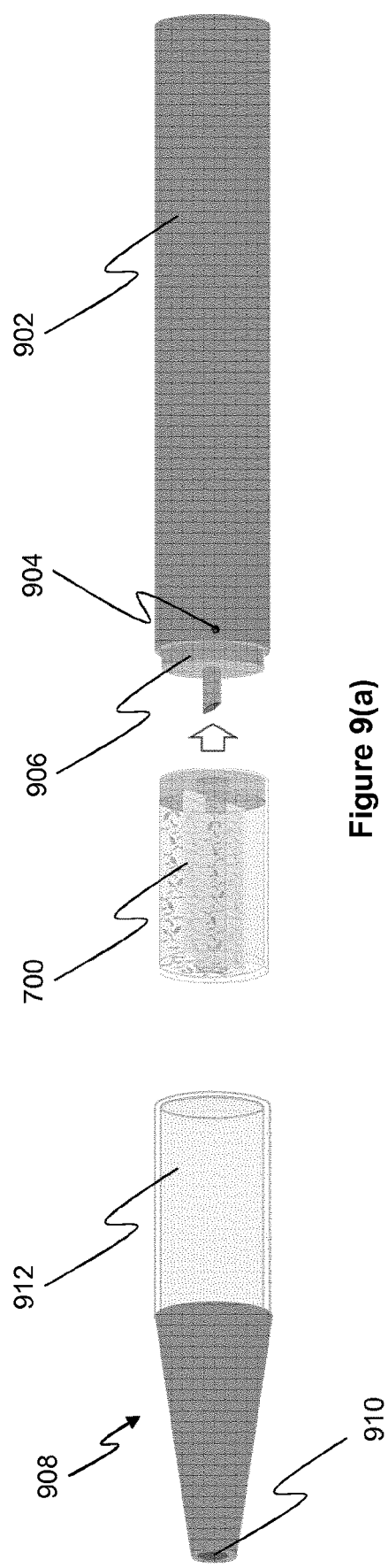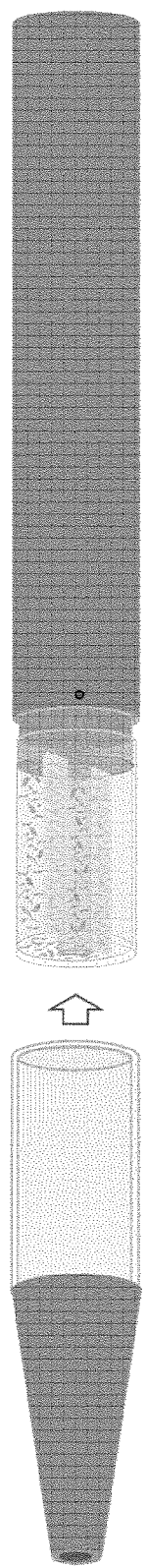
Figure 9(a)
Figure 9(b)
Figure 9(c)

CARTRIDGE AND DEVICE FOR AN AEROSOL-GENERATING SYSTEM

The present invention relates to a cartridge for an aerosol-generating system, and a device for receiving the cartridge.

A number of prior art documents, for example EP-A-0 295 122, EP-A-1 618 803 and EP-A-1 736 065, disclose electrically operated smoking systems, having a number of advantages. One advantage of some examples of such systems is that they can significantly reduce sidestream smoke, while permitting the smoker to selectively suspend and reinitiate smoking.

Prior art documents, such as EP-A-0 295 122, EP-A-1 618 803 and EP-A-1 736 065, disclose electrical smoking systems which use a liquid as the aerosol-forming substrate. The liquid may be contained in a cartridge which is receivable in a housing. A power supply, such as a battery, is provided, connected to a heater to heat the liquid substrate during a puff, to form the aerosol which is provided to the smoker.

According to a first aspect of the present invention, there is provided a cartridge for an aerosol-generating system. The cartridge comprises a liquid storage container, containing a liquid aerosol-forming substrate. The liquid includes at least one flavour object.

Advantageously, the flavour object can provide flavour to the aerosol-forming substrate. For example, the flavour object may infuse the liquid with flavour. This addition of the flavour object to the liquid may to provide the user with an improved experience by changing the taste of the liquid. Where the content of the liquid container can be seen by the user, the addition of a visible flavour object may enhance the experience of the user. The flavour object may comprise a solid material. Other alternatives are possible. For example, the flavour object may be a gel or a composite of more than one material or substance.

Preferably the liquid contains a plurality of flavour objects. The liquid may for example include more than 5, more than 10, or 20 or more flavour objects.

The flavour objects may be all similar or substantially the same, for example in size, shape or composition. In some examples, more than one different flavour object is included in the liquid. The different flavour objects may be different in one or more aspect including size, shape and composition. A flavour object may be for example a particle, granule, pellet, flake, leaf, stick, shred, spaghetti, or strip. The flavour object may for example have a maximum dimension of 4 mm. For example the flavour object may have dimensions less than 3 mm, for example less than 2 mm or less than 1 mm. In some examples, the flavour object will be larger than about 0.1 mm, preferably larger than 0.2 mm, for example larger than 0.5 mm. Where reference is made to the object being larger than a particular size, preferably the object does not pass through a sieve having a mesh opening of that particular size.

For example where the flavour object is in the form of a flake or leaf, the object may for example have a width between about 0.1 mm and about 3 mm, preferably between about 0.2 mm and about 2 mm. The flavour object may have a length between about 0.5 mm and about 4 mm, preferably between about 0.7 mm and about 3 mm. The flavour object may have an average thickness between about 20 μm and about 550 μm, preferably between about 30 μm and about 120 μm.

Preferably the flavour object is visible in the liquid. Preferably the size of the flavour object is such that the object is visible in the liquid by the user. Preferably the flavour object is visible in the cartridge by the user. In some examples, the flavour object is visible to the user during use of an aerosol generating system. The flavour object may be visible to the user when the cartridge is installed in an aerosol generating device.

In examples of the invention, the flavour object comprises plant material. The flavour object may comprise a leaf, stem, stalk, flower, fruit, root or other part of a plant. The flavour object may comprise a herb. The flavour object may comprise a botanical. The flavour object may comprise tobacco. The flavour object may comprise one or more of: powder, granules, pellets, flakes, shreds, spaghettis, or strips containing one or more of: herb leaf, tobacco leaf, fragments of tobacco ribs, reconstituted tobacco, homogenised tobacco, extruded tobacco and expanded tobacco. The flavour object may comprise one or more of mint, rosemary, sage, or other herb. The liquid may further include one or more additional objects which may or may not impart a flavour to the liquid. In a further aspect of the invention there is provided a liquid storage container including liquid aerosol forming substrate, the liquid aerosol forming substrate including a plurality of objects. The objects may have one or more of the features of the flavour objects described herein.

The liquid aerosol-forming substrate may further comprise flavour components in liquid form. The liquid may comprise a tobacco-containing material containing volatile tobacco flavour compounds which are released from the substrate upon heating. The aerosol-forming substrate may comprise a non-tobacco material. The aerosol-forming substrate may comprise tobacco-containing material and non-tobacco containing material. Preferably, the aerosol-forming substrate further comprises an aerosol former. Examples of suitable aerosol formers are glycerine and propylene glycol.

Preferably the flavour object is loose or free in the liquid storage container. In preferred examples of the invention, the flavour object can move in the liquid in the liquid storage container. In some examples, the flavour object may float or be suspended in the liquid. Where the liquid includes a plurality of the flavour objects, the liquid and flavour objects may form a suspension or a colloid. The properties of the liquid and objects may be selected or modified to achieve a desired distribution of the objects in the liquid. For example some of all of the objects may tend to float, sink or be suspended in the liquid. Such properties may be achieved for example by selection of compositions, treatments, coatings or by other means.

Preferably, the cartridge further comprises an outlet, and a filter arranged between the outlet and a portion of the liquid storage container including the flavour object. Preferably, the outlet is for delivery of aerosol-forming substrate from the liquid storage container.

Advantageously, providing a liquid aerosol-forming substrate having a solid flavour object, and a filter between the outlet and that solid flavour object enables a liquid aerosol-forming substrate to be provided which has the advantages of both a liquid and solid aerosol-forming substrate without the difficulty of generating an aerosol directly from a solid substrate without, for example, burning the substrate. The solid flavour object may infuse the liquid aerosol-forming substrate with additional flavour. This maceration process may enable the liquid aerosol-forming substrate to be fresher, and provide the user with an improved experience.

Preferably, the filter is movable between a first position adjacent the outlet and a second position remote from the first position in the liquid storage container. In the second position, the or each solid flavour object is separated from the bulk of the liquid and distant from the outlet. The filter is preferably closer to the outlet when in the first position than when in the second position.

Advantageously, providing a cartridge having a movable filter enables an aerosol-forming substrate having at least one solid flavour object to be provided which enables the liquid composition to be prepared immediately prior to use without the or each solid flavour object interfering with the transfer of liquid out of the cartridge during use. The or each solid flavour object may enable the liquid aerosol-forming substrate to be infused with additional flavour. This maceration process may enable the liquid aerosol-forming substrate to be fresher, and provide the user with an improved experience. Conventional electrically heated aerosol-generating devices cannot use such an advantageous combination of liquid substrate and solid flavour object since the device would become clogged, and the solid flavour object could potentially be burnt by the heating element.

Where the liquid aerosol-forming substrate and the or each solid flavour object are in a suspension, the filter preferably acts to take the or each solid flavour objects out of suspension in the liquid.

The cartridge may further comprise a loose object in the liquid storage container, the loose object being movable in a portion of the liquid storage container, the loose object being retained in the portion of the liquid storage container by the filter.

The cartridge may further comprise a heating element, the filter being arranged in the liquid storage container and spaced apart from the heating element. Further details of the heating element are provided below.

The cartridge may further comprise a liquid transport element, having a first part and a second part, movable from a first position to a second position. In the first position the first part of the liquid transport element is external to the cartridge and adjacent the outlet, and in the second position the first part of the liquid transport element is internal to the cartridge and remote from the outlet. The liquid transport element may further comprise a heating element adjacent the second part of the liquid transport element. The liquid transport element is preferably an elongate shaft, and is preferably substantially rigid.

The filter is preferably configured to receive an end of the liquid transport element received by the outlet, wherein in use, the liquid transport element acts on the filter to move the filter from the first position to the second position.

The filter preferably comprises a through hole configured to receive the end of the liquid transport element. The filter preferably comprises a porous disc having a recess, the filter disposed in the recess. The thickness of the porous disc is preferably configured such that the porous disc remains substantially perpendicular to a longitudinal axis of the liquid storage container as the filter moves from the first position to the second position. The thickness of the porous disc may be between about 50 μm and about 400 μm, preferably between about 70 μm and about 200 μm. The porous disc preferably comprises the through hole. The porous disc may comprise a plurality of perforations. The porous disc may comprise a mesh, preferably a coarse mesh. The porous disc may be moulded from a polymer, such as any of the polymers suitable for forming the canister described above. On receipt of a liquid transport element in the through hole, the filter is preferably configured such that the liquid transport element engages with the filter. The inner diameter of the through hole is preferably such that the liquid transport element is an interference fit within the porous disc.

The cartridge preferably further comprises a seal configured to seal the outlet. The seal may be frangible. The seal may be removable. The seal may be formed from a film. The film may be formed of a metal film, preferably aluminium, more preferably food grade, anodised aluminium, or a polymer such as polypropylene, polyurethane, polyethylene, fluorinated ethylene propylene.

The seal may be formed from a laminate film. At least one layer of the laminate material may be paper or cardboard. The layers of the laminate may be bonded together using adhesive, heat, or pressure. When the laminate comprises a layer of aluminium and a layer of polymer material, the polymer material may be a coating. The coating layer may be thinner than the aluminium layer.

When the cartridge comprises a frangible seal, the first part of the liquid transport element may comprise a piercing portion, configured to pierce the seal. The first part of the liquid transport element may comprise at least one ridge, configured to engage with the filter element.

The internal diameter of the outlet is preferably such that there is a close sliding fit between the outlet and the liquid transport element. Therefore, when the liquid transport element is in the second position, resistance to liquid leakage between the external surface of the liquid transport element and the outlet is improved. The internal diameter of the outlet may be between about 1.5 mm and about 7 mm, preferably between about 2 mm and about 5 mm, more preferably between about 1.8 mm and about 2.3 mm. The external diameter of the liquid transport element may be between about 1.5 mm and about 7 mm, preferably between about 2 mm and about 5 mm, more preferably about 1.8 mm and about 2.3 mm. The tolerance between the internal diameter of the outlet and the external diameter of the liquid transport element is preferably between about 0.05 mm and about 0.3 mm, preferably 0.1 mm and about 0.15 mm.

The outlet may comprise a flexible gasket configured to deform on receipt of the liquid transport element in the outlet. Such a flexible gasket improves the resistance to leakage between the external surface of the liquid transport element and the outlet. The flexible gasket may be an elastomer or a polymer, such as graphene.

Where the cartridge comprises a liquid transport element, the cartridge may further comprise a protective sheath, coupled to the liquid transport element and configured to slidably engage with the liquid storage container of the cartridge. The protective sheath advantageously protects the liquid transport element from damage, or contamination, when the liquid transport element is in the first position. The protective sheath is preferably cylindrical having an open part and a closed part, the internal diameter of the cylinder being such that a close sliding fit is provided between the internal surface of the sheath and the external surface of the liquid storage container.

The liquid transport element may further comprise at least one heating element adjacent the second part of the liquid transport element. The at least one heating element preferably comprises electrical contacts configured to enable an electrical connection to be made to a power supply. Further details of the at least one heating element are provided below. Where a protective sheath is provided, the second part of the liquid transport element comprising the at least one heating element may protrude through the closed end of the sheath.

The liquid transport element may comprise a capillary wick. The capillary wick may be formed from capillary fibres, including glass fibres, carbon fibres, and metallic fibres, or a combination of any and all of glass fibres, carbon fibres and metallic fibres. Providing metallic fibres may enhance the mechanical resistance of the wick without negatively affecting the hydrophobic properties of the overall wick. Such fibres may be provided parallel to the central axis of the wick, and may be braided, twisted or partially non-woven. Preferably, when the liquid transport element is in the second position, the capillary wick is arranged to be in contact with liquid in the liquid storage container. In that case, in use, liquid is transferred from the liquid storage container towards the at least one electric heating element by capillary action in the capillary wick. When the heating element is activated, liquid in the capillary wick is vaporised by the heating element to form the supersaturated vapour. The supersaturated vapour is mixed with and carried in the airflow. During the flow, the vapour condenses to form the aerosol and the aerosol is carried towards the mouth of a user. The heating element in combination with a capillary wick may provide a fast response, because that arrangement may provide a high surface area of liquid to the heating element. Control of the heating element according to the invention may therefore depend on the structure of the capillary wick or other heating arrangement. Further detail regarding the heating element and the control thereof is provided below.

The liquid storage container preferably has a circular cross-section. The liquid storage container may have an oval, rectangular, square, triangular, or similar cross-section. Preferably, the outer diameter of the filter is such that the filter is a close sliding fit within the liquid storage container. Arranging the liquid storage container and the filter such that there is a close sliding fit improves the filtering to reduce or eliminate the presence of solid flavour objects in the bulk of the liquid aerosol-forming substrate when the filter is in the second position. The filter may comprise a seal, such as an o-ring, configured to slide against the inner surface of the liquid storage container.

The cartridge preferably has the same cross-sectional shape as the liquid storage container.

The filter may comprise capillary fibres. The filter may be formed by welding a mat of capillary fibres. The welding may be ultrasonic welding. The filter may have a thickness between about 10 μm and about 110 μm, preferably between about 20 μm and about 70 μm. The filter may be formed from a woven, or non-woven material. The fibres of the woven, or non-woven material may be parallel, twisted, braided, or a combination of any or all of these types of fibres. The filter may comprise a single material, or a plurality of materials. The material may be a metal, or a non-metal natural, synthetic, or both natural and synthetic material. Preferably, the fibres of the filter are formed from cellulose. Preferably the filter is formed from non-woven cellulose fibres. Alternatively, the filter is formed from a mesh, preferably a stainless steel mesh, more preferably medical grade stainless steel.

The liquid storage container may comprise a canister having a closed end and an open end, and a lid comprising the outlet. The canister may comprise a lip, and the lid may comprise a projection, the lip and projection are configured to engage to fix the lid to the canister. The liquid storage container may be a thin-walled canister. The canister may be formed from a substantially transparent material, such as ALTUGLAS® Medical Resins Polymethlymethacrylate (PMMA), Chevron Phillips K-Resin® Styrene-butadiene copolymer (SBC), Arkema special performance polymers Pebax®, Rilsan®, and Rilsan® Clear, DOW (Health+™) Low-Density Polyethylene (LDPE), DOW™ LDPE 91003, DOW™ LDPE 91020 (MFI 2.0; density 923), ExxonMobil™ Polypropylene (PP) PP1013H1, PP1014H1 and PP9074MED, Trinseo CALIBRE™ Polycarbonate (PC) 2060-SERIES. The canister may be moulded, such as by in an injection moulding process.

An advantage of providing a cartridge is that a high level of hygiene can be maintained. Using a liquid transport element, such as a capillary wick, extending between the liquid and the electric heating element, allows the structure of the device to be relatively simple. The liquid has physical properties, including viscosity and surface tension, which allow the liquid to be transported through the liquid transport element, such as by capillary action. The cartridge is preferably not be refillable. Thus, when the liquid in the liquid storage container has been used up, the aerosol generating device is replaced. Preferably, the liquid storage container is arranged to hold liquid for a pre-determined number of puffs.

Where the liquid transport element comprises a capillary wick, the capillary wick may have a fibrous or spongy structure. The capillary wick preferably comprises a bundle of capillaries. For example, the capillary wick may comprise a plurality of fibres or threads, or other fine bore tubes. The fibres or threads may be generally aligned in the longitudinal direction of the aerosol generating device. The capillary wick may comprise sponge-like or foam-like material formed into a rod shape. The structure of the wick forms a plurality of small bores or tubes, through which the liquid can be transported to the at least one heating element, by capillary action. The capillary wick may comprise any suitable material or combination of materials. Examples of suitable materials are ceramic- or graphite-based materials in the form of fibres or sintered powders. The capillary wick may have any suitable capillarity and porosity so as to be used with different liquid physical properties such as density, viscosity, surface tension and vapour pressure. The capillary properties of the wick, combined with the properties of the liquid, ensure that the wick is always wet in the heating area.

The liquid transport element may further comprise a conduit having a first portion and a second portion. The conduit is configured such that, when the liquid transport element is in the first position, the first portion and the second portion of the conduit are external to the liquid storage container, and, when the liquid transport element is in the second position, the first portion of the conduit is internal to the liquid storage container, and the second portion of the conduit is external to the liquid storage container. When the liquid transport element is in the second position, the conduit is preferably configured to transport liquid from within the liquid storage container to without the liquid storage container. The conduit may be hollow. The conduit may comprise capillary material. The conduit may have a heating element disposed therein.

According to a second aspect of the present invention, there is provided an aerosol-generating device configured to receive a cartridge having a liquid transport element and heating element as described herein. The device comprises: a housing having a cavity for receiving the cartridge; a power supply; and electrical contacts configured to couple the heating element of the cartridge to the power supply when the cartridge is received in the cavity.

The device of the second aspect may further comprise an actuator configured to move the liquid transport element from the first position to the second position when the cartridge is received in the cavity. The actuator may be an electrically operated actuator. The electrically operated actuator may be actuated when a cartridge is received in the cavity of the housing. The actuator may be a mechanically operated actuator. The mechanically operated actuator may be user operated. The housing may comprise a lid configured to close the cavity. The lid may be a hinged lid configured to move from a first, open, position to a second, closed position. In the first position, the cartridge may be inserted into the cavity. Where present, the mechanically operated actuator may be coupled to the lid. The action of closing the lid may operate the mechanical actuator to move the liquid transport element from the first position to the second position. The actuator preferably engages the electrical contacts of the device with corresponding electrical contacts on the cartridge to enable power to be supplied to the at least one heater of the cartridge.

Alternatively to providing an actuator, the user may apply a longitudinal compressive force to the cartridge to move the liquid transport element from the first position to the second position, and then insert the cartridge into the device.

According to a third aspect of the present invention, there is provided an aerosol-generating device configured to receive a cartridge without a liquid transport element as described herein. The device comprises: a housing having a cavity for receiving the cartridge; a liquid transport element, having a first part and a second part, the first end being insertable into the outlet of the cartridge; a heating element adjacent the second part of the liquid transport element; and a power supply configured to supply power to the heating element.

The device of the third aspect may further comprise an actuator configured to engage the cartridge with the liquid transport element when the cartridge is received in the cavity, such that the liquid transport element is inserted into the cartridge. The actuator may be an electrically operated actuator. The electrically operated actuator may be actuated when a cartridge is received in the cavity of the housing. The actuator may be a mechanically operated actuator. The mechanically operated actuator may be user operated. The housing may comprise a lid configured to close the cavity. The lid may be a hinged lid configured to move from a first, open, position to a second, closed position. In the first position, the cartridge may be inserted into the cavity. Where present, the mechanically operated actuator may be coupled to the lid. The action of closing the lid may operate the mechanical actuator to move the cartridge towards the liquid transport element such that the liquid transport element is moved into the cartridge from the first position to the second position.

The device of the third aspect preferably further comprises a shield movable from a first position to a second position, wherein in the first position the shield is adjacent the first part of the liquid transport element, and in the second position the shield is adjacent the second part of the liquid transport element, wherein the shield is biased towards the first position. The shield advantageously protects the liquid transport element from damage of contamination before a cartridge is inserted into the cavity.

The device preferably comprises a mouthpiece. As used herein, the term "mouthpiece" preferably refers to a portion of an aerosol-generating system, an aerosol-generating article, or the aerosol-generating device, that is placed into a user's mouth in order to directly inhale an aerosol generated by the aerosol-generating system. The mouthpiece may be removable. The mouthpiece may comprise, or be, a lid for closing the cavity.

The aerosol-generating device may comprise an aerosol-forming chamber in which aerosol forms from a super saturated vapour, which aerosol is then carried into the mouth of a user. An air inlet, air outlet and the chamber are preferably arranged so as to define an airflow route from the air inlet to the air outlet via the aerosol-forming chamber, so as to convey the aerosol to the air outlet and into the mouth of a user. In use, the second end of the liquid transport element is preferably disposed within the aerosol-forming chamber. The air inlet may be provided in a mouthpiece. The air outlet may be provided in the mouthpiece. A portion of the cavity for receiving the cartridge may form the aerosol-forming chamber. The airflow path may extend from the air inlet, through the aerosol-forming chamber, around the cartridge, and to the air outlet.

The mouthpiece may be formed from medical adequate polymeric compounds, including grade polymers, including using DuPont™ Delrin acetal and Zytel® nylon resins, as well as Altuglas® PMMA, Celanex® PBT, ExxonMobil™ PP—Medical Grades, Fortron® PPS, Hostaform® POM, K-Resin® SBC, LD PE Health+™ Dow, Pebax® TPE-A, Riteflex® TPE-E, Vectra® LCP. The mouthpiece may comprise a coating, such as a polymeric coating.

The device housing, preferably the outer body, may comprise the part that is held by the user. The device housing may comprise a coating, preferably the coating is the same as the coating, where provided, on the mouthpiece.

The device may comprise more than one heating element, for example two, or three, or four, or five, or six or more heating elements. The heating element or heating elements may be arranged appropriately so as to most effectively heat the aerosol-forming substrate.

The at least one electric heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colo. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polylmide or mica foil. Kapton® is a registered trade mark of E.I. du Pont de Nemours and Company, 1007 Market Street, Wilmington, Del. 19898, United States of America.

The at least one electric heating element may comprise an infra-red heating element, a photonic source, or an inductive heating element.

The at least one electric heating element may take any suitable form. The at least one electric heating element may take the form of a casing or substrate having different electro-conductive portions, or an electrically resistive metallic tube. The cartridge may incorporate a disposable heating element. The at least one electric heating element may be a disk (end) heating element or a combination of a disk heating element with heating needles or rods. The at least one electric heating element may comprise a flexible sheet of material arranged to surround or partially surround the aerosol-forming substrate. Other possibilities include a heating wire or filament, for example a Ni—Cr, platinum, tungsten or alloy wire, or a heating plate. Optionally, the heating element may be deposited in or on a rigid carrier material.

The at least one electric heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. Preferably, the material has a high heat capacity (sensible heat storage material), or is a material capable of absorbing and subsequently releasing heat via a reversible process, such as a high temperature phase change. Suitable heat storage materials include silica gel, alumina, carbon, glass mat, glass fibre, minerals, a metal or alloy such as aluminium, silver or lead, and a cellulose material such as paper. Other materials which release heat via a reversible phase change include paraffin, sodium acetate, naphthalene, wax, polyethylene oxide, a metal, metal salt, a mixture of eutectic salts or an alloy.

The heat sink or heat reservoir may be arranged such that it is directly in contact with the aerosol-forming substrate and can transfer the stored heat directly to the substrate. The heat stored in the heat sink or heat reservoir may be transferred to the aerosol-forming substrate by means of a heat conductor, such as a metallic tube.

The at least one heating element may heat the aerosol-forming substrate by conduction. The heating element may be at least partially in contact with the substrate, or the carrier on which the substrate is deposited. The heat from the heating element may be conducted to the substrate by a heat conductive element.

The at least one heating element may transfer heat to the incoming ambient air that is drawn through the electrically heated aerosol generating device during use, which in turn heats the aerosol-forming substrate by convection. The ambient air may be first drawn through the substrate and then heated.

Control of the at least one electric heating element may depend upon the physical properties of the liquid substrate, such as the boiling point, vapour pressure, and surface tension.

The device may comprise control circuitry configured to control the supply of power from the power supply to the or each heating element. The control circuitry may comprise a puff sensor configured to detect when a user draws on the device, the control circuitry activates the heater when a puff is detected. The device may comprise a user input, such as a switch, for activating the device.

The power supply may be an external electric power supply or an on-board electric power supply. The power supply may be AC or DC, preferably DC. The power supply may be a battery. The power supply may alternatively be another form of charge storage device such as a capacitor. The power supply may require recharging and may have a capacity that allows for the storage of enough energy for one or more smoking experiences; for example, the power supply may have sufficient capacity to allow for the continuous generation of aerosol for a period of around six minutes, corresponding to the typical time taken to smoke a conventional cigarette, or for a period that is a multiple of six minutes; in another example, the power supply may have sufficient capacity to allow for a predetermined number of puffs or discrete activations of the heater.

Preferably, the aerosol generating device is portable. The aerosol generating device may be a smoking device and may have a size comparable to a conventional cigar or cigarette. The smoking device may have a total length between approximately 30 mm and approximately 150 mm. The smoking device may have an external diameter between approximately 5 mm and approximately 30 mm.

According to a fourth aspect of the present invention, there is provided an aerosol-generating device configured to releasably receive a cartridge as described herein. The device comprises a power supply for powering a heating element arranged to heat liquid aerosol-forming substrate delivered to the heating element from the liquid storage container, to generate an aerosol.

According to a fifth aspect of the present invention, there is provided an aerosol-generating device including a cartridge as described herein. The device may be disposable, in that the cartridge may not be refillable or replaceable after use.

According to a further aspect of the present invention, there is provided an electrically heated aerosol-generating system comprising a cartridge as described herein, and an aerosol-generating device as described herein.

Any feature in one aspect of the invention may be applied to other aspects of the invention, in any appropriate combination. In particular, method aspects may be applied to apparatus aspects, and vice versa. Furthermore, any, some or all features in one aspect can be applied to any, some or all features in any other aspect, in any appropriate combination.

It should also be appreciated that particular combinations of the various features described and defined in any aspects of the invention can be implemented and/or supplied and/or used independently.

The disclosure extends to methods and apparatus substantially as herein described with reference to the accompanying drawings.

The invention will be further described, by way of example only, with reference to the accompanying drawings in which:

FIG. 2 shows an aerosol-generating device according to one embodiment of the present invention;

FIG. 3 shows a system comprising the aerosol-generating device of FIG. 2 with the cartridge of FIG. 1;

Figure 4C:
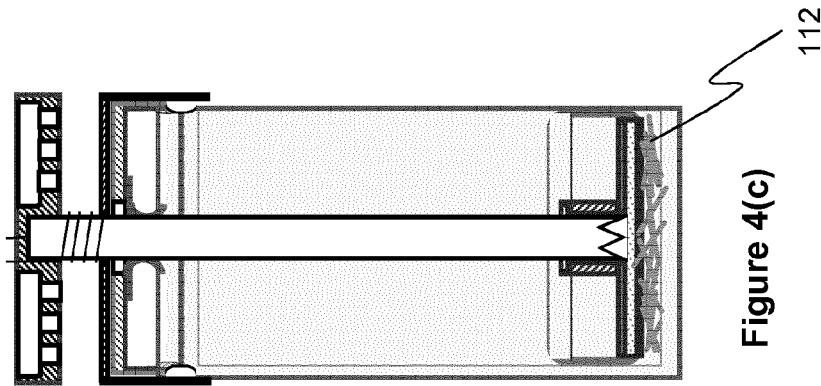
Figure 4B:
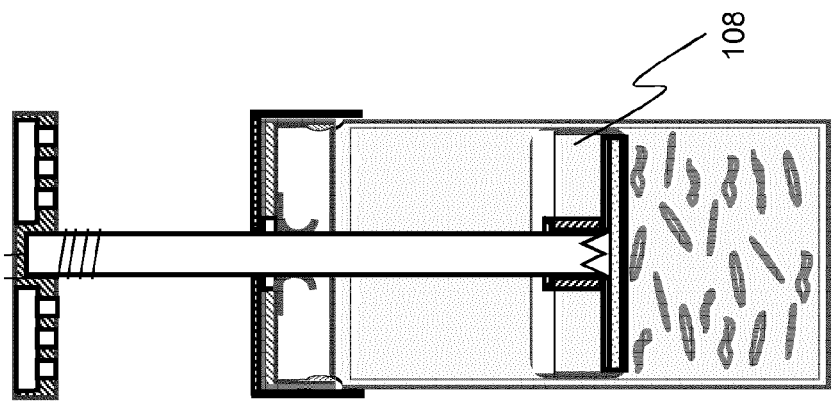
Figure 4A:
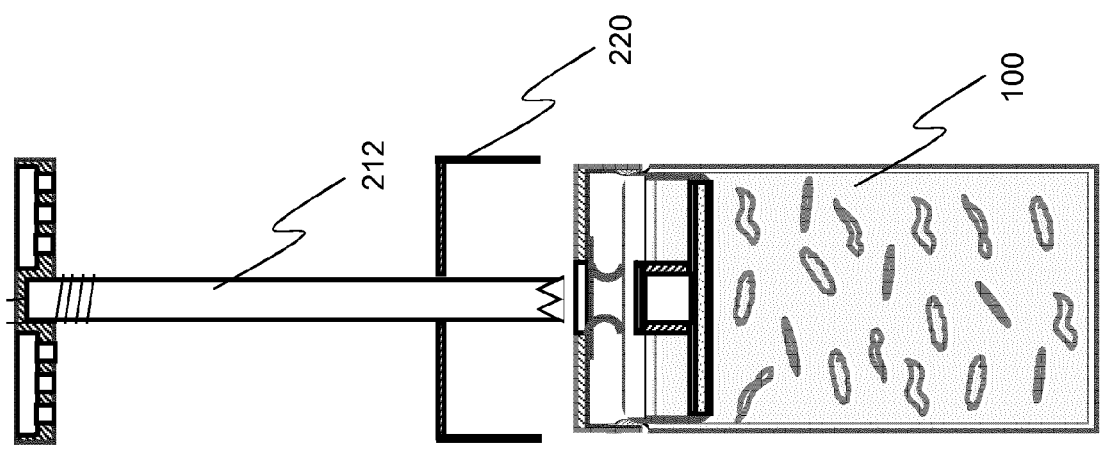
Figures 5A, 5B:
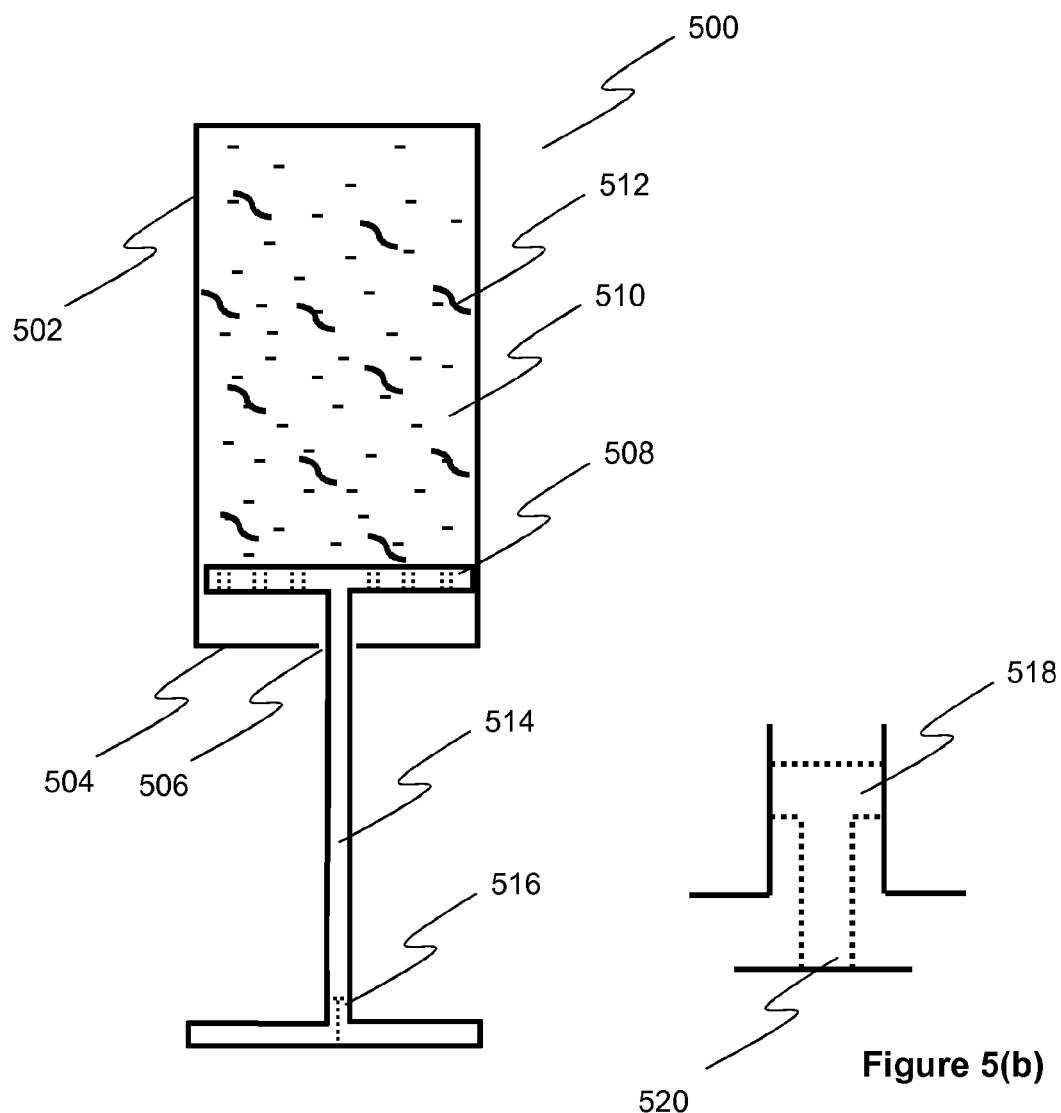
Figure 10:
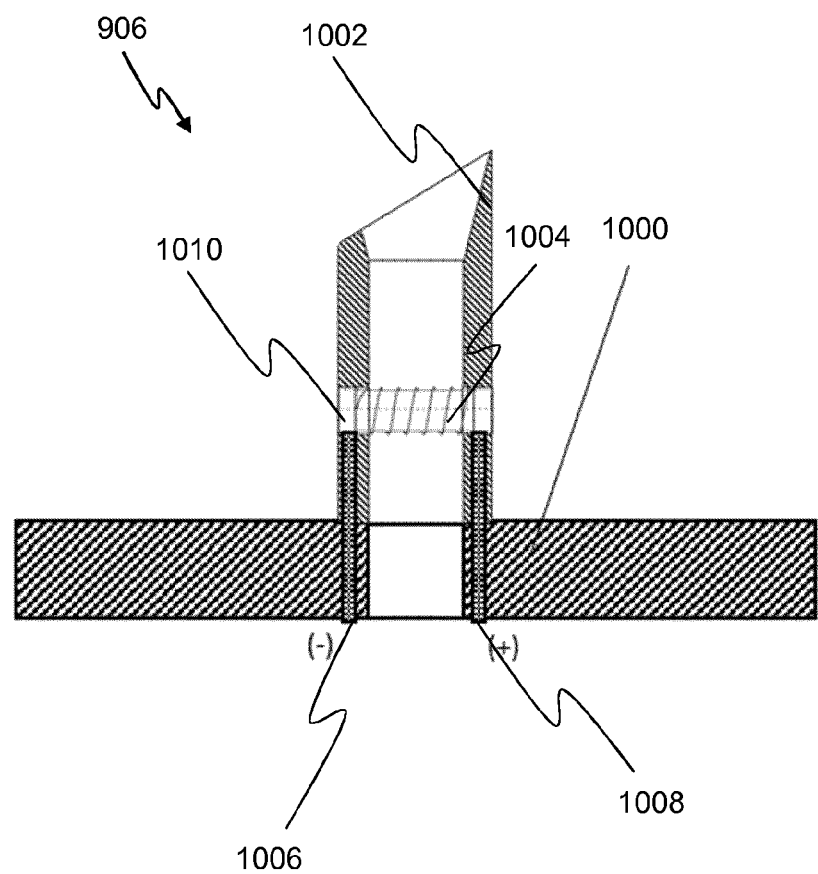

FIGS. 4(a), 4(b), and 4(c) show the system of FIG. 3 in use;

FIGS. 5(a) and 5(b) show a cartridge according to an alternative embodiment of the present invention;

FIG. 6 shows an aerosol-generating device according to an alternative embodiment of the present invention;

FIG. 7 shows a cartridge according to an alternative embodiment of the present invention;

FIG. 8 shows an exploded view of the cartridge shown in FIG. 7;

FIGS. 9(a), 9(b) and 9(c) show an aerosol-generating device according to a further alternative embodiment of the present invention; and FIG. 10 shows a detailed view of a heater assembly of the aerosol-generating device shown in FIGS. 9(a), 9(b), and 9(c).

Figure 1:
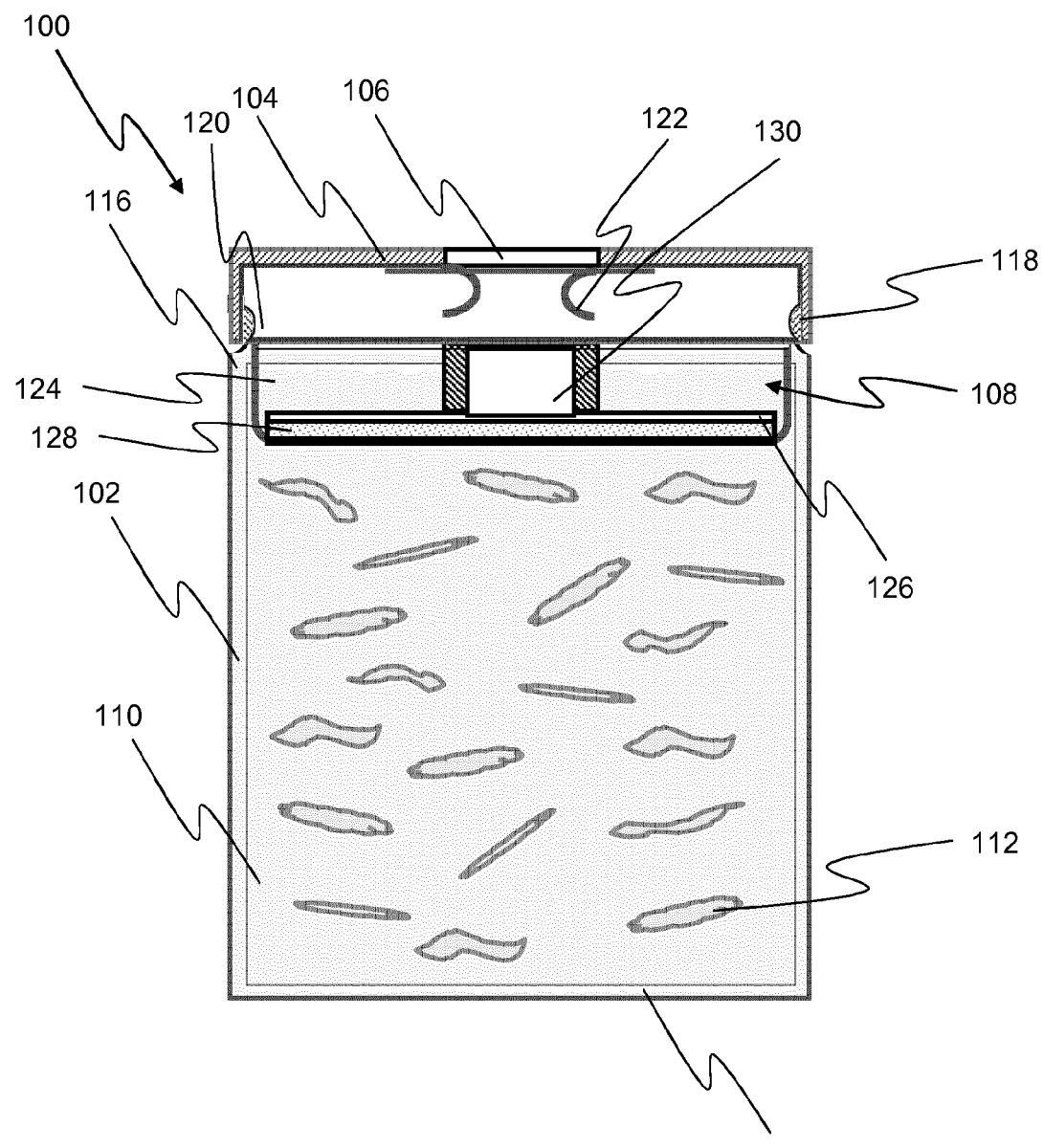
FIG. 1 shows a cartridge according to one embodiment of the present invention.

FIG. 1 shows a cartridge 100, comprising a liquid storage container in the form of canister 102, a lid 104 having an outlet 106, and a filter element 108. The canister 102 comprises a liquid aerosol-forming substrate 110 having flakes of solid tobacco material 112. As used herein, "flakes of solid tobacco material" refers to leaves of tobacco, shreds of homogenised tobacco, or the like. The liquid aerosol-generating substrate comprises a nicotine-containing material and an aerosol former such as propylene glycol or glycerine, which are released from the aerosol-forming substrate upon heating. The solid tobacco material is macerated in the liquid to impart tobacco flavor compounds which are also released upon heating.

The canister 102 is cylindrical and has a closed end 114 and an open end 116. The canister is sealed by the lid 104, and a frangible film disposed over the outlet 106. The lid comprises a protrusion 118 around the circumference of the lid which engages with a corresponding lip 120 adjacent the open end of the canister. The lid further comprises a flexible gasket 122 configured to receive a liquid transport element, which is described in further detail below.

The canister 102 may be substantially transparent to allow the user to view the contents of the cartridge 100.

The filter element 108 comprises a porous disc 124 and a filter 126. The porous disc 124 comprises a porous base 128 in the form of a coarse mesh. The filter 126 is formed of capillary fibres which are ultrasonically welded together. The filter is affixed to the underside of the porous base 128. The porous disc 124 further comprises a through hole 130 configured to receive a liquid transport element.

In use, the filter element is configured to be movable to strain the solid tobacco flakes from the liquid, and move the flakes away from the outlet 106.

As can be seen, the filter element 108 has an external diameter such that a close sliding fit is provided in the canister 102. In this way, the tobacco flakes are prevented from passing around the filter element as the filter element moves along the canister. The thickness of the porous disc 124 is such that the disc remains substantially perpendicular to the longitudinal axis of the cartridge as it moves from the position shown in FIG. 1, the first position, to a position adjacent the closed end 114, the second position.

Such a cartridge enables the tobacco flakes to macerate in the liquid until just before use in an aerosol-generating device, imparting tobacco flavour to the liquid aerosol-forming substrate.

FIG. 2 shows an aerosol-generating device 200 configured to receive and use the cartridge 100. The device 200 comprises an outer housing 202, a removable mouthpiece 204, a power supply 206 in the form of a rechargeable battery, control circuitry 208, and a cavity 210 configured to receive a cartridge 100. The cavity 210 comprises a liquid transport element 212 having a first, free, end 214 and a second end 216 attached to the device 200. The liquid transport element 212 comprises a resistive heating element 218 adjacent the second end 216. The heating element 218 is electrically coupled to the power supply 206 via the control circuitry 208. The first end 214 of the liquid transport element 212 comprises ridges configured to both pierce the frangible seal on the cartridge 100, and to engage with the filter 126. The liquid transport element 212 is a capillary wick for transporting liquid from the canister 102 of a cartridge 100 to the heating element 218.

The cavity further comprises a shield 220. The shield is biased, for example by a spring, towards the mouthpiece end of the device, and is configured to slide over the liquid transport element 212. The shield protects the liquid transport element 212 from damage and contamination when the device is not in use. An air inlet (not shown), and an air outlet in the mouthpiece (not shown) are provided, together with an airflow pathway which extends from the air inlet to the air outlet via the cavity.

FIG. 3 shows the device 200 with a cartridge 100 inserted in the cavity 210. FIGS. 4(*a*), 4(*b*) and 4(*c*) show the process of the user inserting the cartridge 100 into the device 200. In use, the user removes the mouthpiece 204 to open the cavity 210. The user then inserts the cartridge 100 into the cavity 210. The cartridge engages with the shield 220 which guides the cartridge 100 such that the liquid transport element 212 first pierces the frangible seal, and then moves through the flexible gasket 122, and engages with the through hole 130 of the porous disc 124. As the cartridge 100 is inserted further into the cavity, the liquid transport element 212 moves the filter element 108 from the first position (shown in FIG. 1) to the second position (shown in FIGS. 3 and 4(*c*)) such that the tobacco flakes are strained from the liquid 110 and moved away from the heating element 216. If the tobacco flakes are not moved away from the heating element, they may burn in use. As can be seen, the ridges on the first end 214 of the liquid transport element 212 enable liquid to be drawn into the end of the liquid transport element.

In use, the user activates the device, either by drawing on the mouthpiece which activates a puff sensor, or by a switch. The heating element 218 is then provided with power from the power supply 206, liquid in the capillary wick is vaporised by the heating element to form a supersaturated vapour. The vapour is then entrained in the airflow generated by the user drawing on the device, and forms an aerosol. Further liquid is drawn along the liquid transport 212 element by capillary action.

The outer housing 202 in the region of the cavity 210 may be substantially transparent to allow the user to view the contents of the cartridge 100.

An alternative example of a cartridge 500 is shown in FIG. 5(*a*). The cartridge 500 is similar to that shown in FIG. 1. The cartridge 500 again comprises a canister 502, lid 504 having an outlet 506, filter element 508, and liquid aerosol-forming substrate 510 comprising solid tobacco flakes 512. In this example the cartridge 500 comprises the liquid transport element 514 coupled to the filter element 508. The liquid transport element 514 may be the same as the liquid transport element 212 of device 200, or it may not be formed from a capillary wick. In the example, shown the liquid is transported by a tube 516 provided at the second end of the liquid transport element. The tube 516, shown in detail in FIG. 5(*b*), has a pair of inlets 518 in the shaft of the liquid transport element, and an outlet 520 at the second end of the liquid transport element. As will now be appreciated, in use, the liquid transport element is moved from the first position shown in FIG. 5(*a*) to a second position such that the pair of inlets for the tube 516 are within the canister and are able to transport liquid to an external heating element.

The cartridge may be used in a device 600 such as that shown in FIG. 6. The device is similar to that shown in FIG. 2, and comprises an outer housing 602, a mouthpiece 604, a power supply 606 and control electronic 608. The housing 602 comprises a cavity 610 for receiving a cartridge having an integral liquid transport element, such as cartridge 500 described above. The cavity is provided with a lid 612 configured to cover and close the cavity in use. The lid comprises a mechanism 614 for forcing the liquid transport element from the first position to the second position when the lid is closed by the user. The lid may be substantially transparent to enable the user to view the straining process as the lid is closed. The device 600 further comprises a heating element disposed in the cavity 610 for heating the liquid transported by the tube 516.

Once the lid is closed, the device 600 operates in the same manner as described above in relation to the device of FIG. 2.

FIG. 7 shows a cartridge 700, comprising a liquid storage container in the form of canister 702. The canister 702 comprises a central hollow portion 704, and an outlet 706 provided at one end of the central hollow portion. At one end of the central hollow portion 704, a frangible seal 708 is provided to seal the outlet 706 before use. A partition 710 is provided which divides the canister 702 into two liquid storage portions 712 and 714. At the end of the canister 702 having the outlet 706 a liquid delivery assembly is provided. The liquid delivery assembly comprises a filter element 716, and a porous capillary element 718. The porous capillary element 718 is formed from a high retention material to reduce or prevent leakage from the cartridge during use. The two liquid storage portions 712 and 714 are in fluid communication. This can be achieved either through the liquid delivery assembly, or by forming the partition 710 from a fluid permeable, or semi-permeable material.

The canister 702 is transparent and comprises two liquid aerosol-forming substrates, one in each of the two liquid storage portions 712 and 714. One of the liquid aerosol-forming substrates comprises flakes of solid tobacco material 720, similar to those described above with regards to FIG. 1. The solid material may be any other type of flavour imparting material as described herein. The liquid aerosol-forming substrate comprises a nicotine-containing material and an aerosol former such as propylene glycol or glycerine, which are released from the aerosol-forming substrate upon heating. The solid tobacco material is macerated in the liquid to impart tobacco flavour compounds which are also released upon heating.

An exploded view of the cartridge 700 is shown in FIG. 8. As will be appreciated, the canister 702 is not shown for simplicity and clarity.

FIGS. 9(a), 9(b) and 9(c) show an aerosol-generating device 900 for use with the cartridge 700. The aerosol-generating device is similar to device 200 shown in FIG. 2. The device comprises a main body 902 comprising a power supply and control electronics (not shown), an air inlet 904 and a heater assembly 906. The device further comprises a detachable mouthpiece portion 908 having an air outlet 910 and a transparent section 912 for receiving the cartridge 700. In use, the user inserts the cartridge onto the heater assembly, as shown in FIG. 9(b). The heater assembly, described in further detail below with reference to FIG. 10, pierces the seal 708 and engages with the liquid delivery assembly of the cartridge 700. The user then attaches the mouthpiece portion 908, as shown in FIG. 9, to complete the assembly of the device. The transparent section 912 enables the user to view the cartridge 700, and therefore the solid tobacco material 720 provided therein.

The heater assembly 906, shown in FIG. 10, comprises a heater mount 1000, a hollow piercing element 1002, and an electrical heating element 1004. The electrical heating element is provided with electrical contacts 1006 and 1008 configured to electrically couple the heating element to the power supply via the control electronics. The heating element 1004 is provided transverse the longitudinal axis of the piercing element 1002 in a through hole 1010.

In use, when the cartridge 700 is received in the device 900, the through hole 1010 is in fluid communication with the liquid delivery assembly of the cartridge. In this way, liquid is provided to the heating element 1004 to be aerosolised upon heating. An airflow pathway is formed from the air inlet 904, through the hollow piercing element 1002 of the heater assembly 1000 and over the heating element 1004, through the central hollow portion 704 of the cartridge, and out of the air outlet in the mouthpiece. When power is provided to the heating element 1004 the liquid is vaporised, and by capillary action, replaced with further liquid by the liquid delivery assembly.

The invention claimed is:

1. A cartridge for an aerosol-generating system, the cartridge comprising:
   a liquid storage container, containing a liquid aerosol-forming substrate, liquid of the liquid aerosol-forming substrate including at least one flavor object;
   an outlet;
   a filter disposed between the outlet and a portion of the liquid storage container including the flavor object; and
   a liquid transport element, having a first part and a second part, movable from a first position to a second position, wherein in the first position the first part of the liquid transport element is external to the cartridge and adjacent the outlet, and in the second position the first part of the liquid transport element is internal to the cartridge and remote from the outlet.

2. The cartridge according to claim 1, wherein the liquid includes a plurality of flavor objects.

3. The cartridge according to claim 1, wherein the at least one flavor object is loose in the liquid storage container.

4. The cartridge according to claim 1, wherein the flavor object is visible in the cartridge.

5. The cartridge according to claim 1, wherein the flavor object comprises plant material.

6. The cartridge according to claim 1, wherein the filter is movable between a first position and a second position in the liquid storage container, the filter being closer to the outlet when in the first position than when in the second position.

7. The cartridge according to claim 1, wherein the filter comprises a mesh.

8. The cartridge according to claim 1, further comprising a loose object in the liquid storage container, the loose object being movable in a portion of the liquid storage container, and the loose object being retained in the portion of the liquid storage container by the filter.

9. An aerosol-generating device including a cartridge, the cartridge comprising:
   a liquid storage container, containing a liquid aerosol-forming substrate, liquid of the liquid aerosol-forming substrate including at least one flavor object;
   an outlet;
   a filter disposed between the outlet and a portion of the liquid storage container including the flavor object; and
   a liquid transport element, having a first part and a second part, movable from a first position to a second position, wherein in the first position the first part of the liquid transport element is external to the cartridge and adjacent the outlet, and in the second position the first part of the liquid transport element is internal to the cartridge and remote from the outlet.

* * * * *